(12) United States Patent
DeSanti et al.

(10) Patent No.: US 7,844,056 B1
(45) Date of Patent: Nov. 30, 2010

(54) METHOD AND APPARATUS FOR ENCAPSULATING LONG MESSAGES OVER LIMITED FIBRE CHANNEL EXTENDED LINK SERVICE

(75) Inventors: Claudio DeSanti, San Jose, CA (US); Fabio Maino, Palo Alto, CA (US)

(73) Assignee: Cisco Technology, Inc., san Jose, CA (US)

( * ) Notice: Subject to any disclaimer, the term of this patent is extended or adjusted under 35 U.S.C. 154(b) by 966 days.

(21) Appl. No.: 10/678,014

(22) Filed: Oct. 1, 2003

(51) Int. Cl.
*H04K 1/00* (2006.01)

(52) U.S. Cl. .............................. 380/258; 726/2; 726/26; 726/27; 726/28

(58) Field of Classification Search ................... 726/30; 713/150
See application file for complete search history.

(56) References Cited

U.S. PATENT DOCUMENTS

| | | | |
|---|---|---|---|
| 6,216,165 B1 | 4/2001 | Woltz et al. | |
| 6,721,335 B1 | 4/2004 | Gregg | |
| 7,149,769 B2 * | 12/2006 | Lubbers et al. | 709/201 |
| 7,222,360 B1 * | 5/2007 | Miller | 726/3 |
| 2002/0141424 A1 | 10/2002 | Gasbarro et al. | |
| 2003/0163727 A1 | 8/2003 | Hammons et al. | |
| 2004/0049601 A1 | 3/2004 | Boyd et al. | |
| 2005/0172199 A1 | 8/2005 | Miller et al. | |

OTHER PUBLICATIONS

RFC 791: Internet Protocol—DARPA Internet Program Protocol Specification, Information Sciences Institute, University of Southern California, Sep. 1981, p. 1-50.*

RFC 791: Internet Protocol—DARPA Internet Program Protocol Specification, Information Sciences Institute, University of Southern California, Sep. 1981, pp. 1-4.*

"Fibre Channel Framing and Signaling Standard", Rev 1.90, International Committee for Information Technology Standards (INCITS), Apr. 9, 2003.

"Fibre Channel Switch Fabric"—2, Rev. 5.4, INCITS, Jun. 26, 2001.

(Continued)

Primary Examiner—David Garcia Cervetti
Assistant Examiner—Daniel L Hoang
(74) Attorney, Agent, or Firm—Weaver Austin Villeneuve and Sampson LLP

(57) ABSTRACT

A method and apparatus for encapsulating long messages over limited Fiber Channel ELSs. The method includes ascertaining if the authentication message has a length that exceeds the message length supported by the device with which communication is sought, and either: fragmenting the authentication message into message fragments if the length of the message exceeds the message length supported by that particular device and sequentially sending the message fragments one by one; or sending the authentication message in its entirety if the length of the authentication message is less than the message length supported by that particular device. When the message is fragmented, a fragmentation bit in the message fragment is set except for the last message fragment. The set fragmentation bit indicates that subsequent fragments are to be sent. The fragmentation bit of the last fragment is reset to indicate that it is the last fragment in the authentication message. This fragmentation method enables initiating and target entities implementing a limited form of ELSs to send long authentication messages to one another in a Fiber Channel Switching Fabric.

25 Claims, 3 Drawing Sheets

OTHER PUBLICATIONS

"*Fibre Channel Generic Services*" —3, Rev. 7.01, INCITS, Nov. 28, 2000.

"*Fibre Channel Security Protocols*", Rev. 1.1, INCITS, Apr. 17, 2003.

"*Limited ELS Buffer Proposal*", Scheible, John, T11/02-195v5, INCITS, Dec. 5, 2002.

"*AUTH ELS Specification*", Nixon, Bob, T11.3/02-561v2, Nov. 27, 2002.

"*FCsec; a security framework of Fibre Channel*", DeSanti et al., T11/02-071v0, Feb. 4, 2002.

Office Action, U.S. Appl. No. 10/791,142, mailed Oct. 5, 2007.

* cited by examiner

| Item | Size (Bytes) |
|---|---|
| 12 — AUTH_ELS Code: 90h | 1 |
| 14 — AUTH_ELS Flags | 1 |
| 16 — AUTH Message Code | 1 |
| 18 — Protocol Version | 1 |
| 17 — Message Length | 4 |
| 19 — Transaction Identifier | 4 |
| 20 — Message Payload | n |

10

| Bit | Interpretation | |
|---|---|---|
| 7 | 1=More Fragments Follow 0=No More Fragments | 30 |
| 6....1 | Reserved | 34 |
| 0 | Sequence Number | 32 |

14

METHOD AND APPARATUS FOR ENCAPSULATING LONG MESSAGES OVER LIMITED FIBRE CHANNEL EXTENDED LINK SERVICE

FIELD OF THE INVENTION

The present invention relates generally to a Fibre Channel Fabrics, and more particularly, to an apparatus and method for encapsulating long messages over limited Fibre Channel Extended Link Services (ELSs).

BACKGROUND OF THE INVENTION

With the increasing popularity of Internet commerce and network centric computing, businesses and other organizations are becoming more and more reliant on information. To handle all of this data, storage area networks or SANs have become very popular. A SAN typically includes a number of storage devices, a plurality of Hosts, and a number of Switches arranged in a Switching Fabric that connects the storage devices and the Hosts.

Most SANs rely on the Fibre Channel protocol for communication within the Fabric. For a detailed explanation of the Fibre Channel protocol and Fibre Channel Switching Fabrics and Services, see the Fibre Channel Framing and Signaling Standard, Rev 1.90, International Committee for Information Technology Standards (INCITS), Apr. 9, 2003, and the Fibre Channel Switch Fabric—2, Rev. 5.4, INCITS, Jun. 26, 2001, and the Fibre Channel Generic Services—3, Rev. 7.01, INCITS, Nov. 28, 2000, all incorporated by reference herein for all purposes.

Fibre Channel Fabrics use several kinds of databases replicated among all the Switches, such as the Zoning database. In some cases the information contained in these databases is relatively static, meaning that it changes only by way of an administrative action, while in other cases the databases are automatically populated by the Switches, and they may change much more frequently. An example of relatively static information is the information needed to maintain and enforce security within the Fabric. Security information within a Fibre Channel Fabric performs two basic roles, authorization and authentication. Authorization determines which entities in the SAN can perform which functions. Authentication involves the confirmation that entities connected to the SAN, such as Switches, Hosts and storage devices, are who they claim to be.

The Zoning information is part of the Authorization information. Within each zone, Hosts can see and access only storage devices or other Hosts belonging to that zone. This allows the coexistence of different computing environments within the same SAN. For example, it is possible to define within a SAN one or more separate Unix zones and/or Window zones. The Unix servers belonging to a specific Unix zone may access only storage or Hosts entities within that Unix zone and are not permitted to access or interfere with the other entities in other zones connected to the SAN. In the same manner, Windows servers belonging to a particular Windows zone may access storage or Hosts entities only within that Windows zone, without accessing or interfering with the other entities in other zones connected to the SAN. The Switching Fabric allows communications only between entities belonging to the same zone, preventing an entity of one zone from seeing or accessing an entity of another zone.

In an environment with high security requirements, Zoning alone is typically not sufficient. Consequently, in many secure SANs, each entity, Switch or end device, is required to authenticate itself to the Fabric before to be admitted in the SAN (i.e., the requesting entity is required to demonstrate that it is in fact who it claims to be before access is granted). In the same manner, when a first end entity wishes to access a second end entity within a zone, the first entity is required to authenticate itself. This is typically done by following the rules of an Authentication protocol, i.e. by exchanging a set of authentication messages between the two entities. Currently three types of authentication protocols are defined. The DH-CHAP protocol relies on a password to verify the identity of an entity. The SRP protocol relies on a password and a verifier. The FCAP protocol relies on a digital certificate to verify the identity of the entity. For more information on these protocols, please see the Fibre Channel Security Protocols, Rev. 1.1, INCITS, Apr. 17, 2003, incorporated by reference herein.

Regardless of the Authentication protocol used, some form of "secret" is used to authenticate the entities. These secrets are used to construct the Authentication protocol messages exchanged between entities, in a manner dependent by each particular protocol. The resulting messages are usually fairly large, in particular they are usually bigger than 128 bytes.

Within a Fabric, communication may take place between two Hosts or a Host and a storage device (generally referred to as device to device communication), between an end device and the Fabric (device to Fabric communication), or between Switches (Switch to Switch communication). Regardless of the type of communication, one of the aforementioned protocols is used to authenticate the requesting entity.

Switch to Switch control communication occurs through the Switch Internal Link Services (SW_ILSs) which leverages the Fibre Channel Sequence mechanism to carry messages potentially very long, such as a Zone Merge Request. Authentication between Switches is therefore not a problem. SW_ILSs are able to carry authentication messages of any size, regardless of the Authentication protocol used, without problems or modifications.

Device to device or device to Fabric communication, however, occurs through the use of the Extended Link Services (ELSs). Although ELSs are designed in theory to leverage the Fibre Channel Sequence mechanism to carry long messages, in practice a significant amount of the device designs and implementations commercially available on the market are able to support only a very simplified form of ELSs. In particular, these devices do not support the Fibre Channel Sequence mechanism and have a limited buffer space (usually 128 bytes or less) for ELSs. This means that these devices can handle only ELS messages composed of a single FC frame not bigger than 128 bytes and are incapable of handling larger messages. Authentication between devices (Nx_Port to Nx_Port), or between device and Fabric (Nx_Port to Fx_Port) is thus a problem for this kind of devices, since they are not able to carry the long ELS messages potentially required by Authentication protocols. This problem does not affect only the devices with the aforementioned limitation, but affects also the Switches to which they connect, since the Switches need to interoperate with devices having limitations in the ELS implementation, as well as with devices without limitations.

An apparatus and method for encapsulating long messages over the limited Extended Link Services used by certain devices in Fibre Channel Fabrics is therefore needed.

SUMMARY OF THE INVENTION

To achieve the foregoing and other objectives and in accordance with the purpose of the present invention, an apparatus and method for encapsulating long messages over limited Fibre Channel ELSs is provided. The method includes ascertaining if the authentication message has a length that exceeds the message length supported by the device with which communication is sought, and either: fragmenting the authentication message into message fragments if the length of the message exceeds the message length supported by that particular device and sequentially sending the message fragments one by one; or sending the authentication message in its entirety if the length of the authentication message is less than the message length supported by that particular device. When the message is fragmented, a fragmentation bit in the message fragment is set except for the last message fragment. The set fragmentation bit indicates that subsequent fragments are to be sent. The fragmentation bit of the last fragment is reset to indicate that it is the last fragment in the authentication message. This fragmentation method enables initiating and target entities implementing a limited form of ELSs to send long authentication messages to one another in a Fibre Channel Switching Fabric.

BRIEF DESCRIPTION OF THE DRAWINGS

The features of the present invention may best be understood by reference to the following description of the presently preferred embodiments together with the accompanying drawings.

Like reference numbers refer to like elements in the figures.

DETAILED DESCRIPTION OF THE INVENTION

The present invention relates to the encapsulation of authentication messages over limited Fibre Channel ELSs. This invention is accomplished by providing fragmentation support to Authentication messages.

Figures 1, 2, 3:
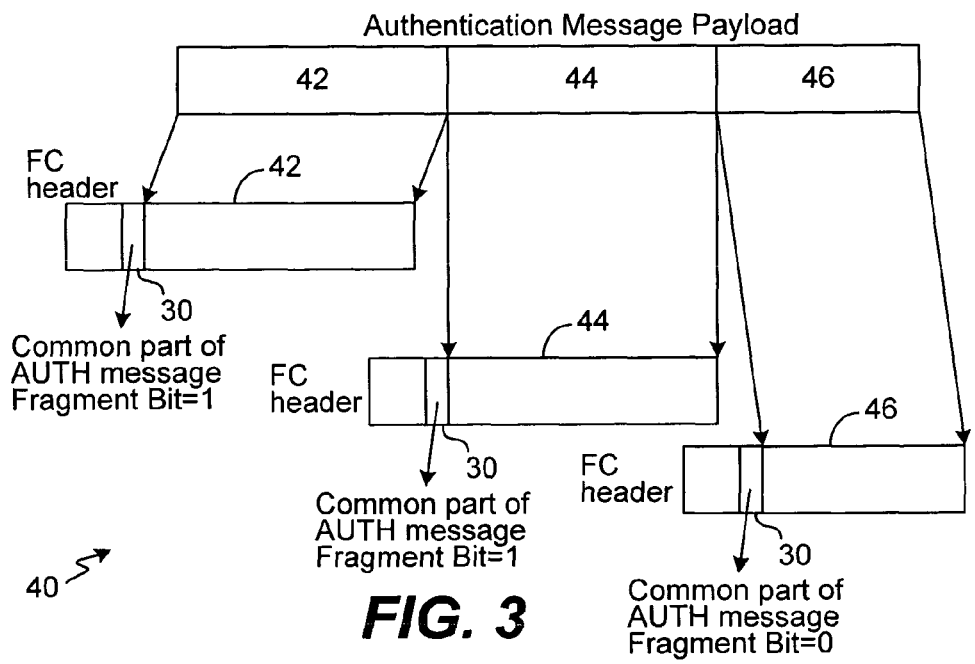
FIG. 1 is a table defining the structure of the authentication message of the present invention.
FIG. 2 is a table defining the fragmentation field of the authentication message structure according to the present invention.
FIG. 3 is a diagram of an authentication message according to the present invention.

Referring to FIG. 1, a table defining the structure of the authentication ELS message (AUTH_ELS) as modified by the present invention is shown. The table 10 includes a field 12 for identifying an ELS message as an authentication message (AUTH_ELS Code: 90h), a Flags field 14, an Authentication Message Code field 16, a Protocol Version field 18, a Message Length field 17, a Transaction Identifier field 19, and a Message Payload field 20. The field 12 identifies an ELS message as an authentication message when the content of the field has a 90h value. The AUTH Message Code field 16 identifies the type of authentication message carried in the payload of the ELS message. The Protocol Version field 18 is reserved for possible future needs. The Message Length field 17 contains the length of the authentication message carried in the AUTH_ELS. The Transaction Identifier 19 contains an identifier used to relate together the messages that compose a particular Authentication protocol, which may be, as previously described, DH-CHAP or SRP or FCAP. The Message Payload 20 contains the actual Authentication message carried by the AUTH_ELS. The AUTH_ELS Flags field 14 is the modification added by to the AUTH_ELS messages according to this invention.

Referring to FIG. 2, a table defining the AUTH_ELS Flags field 14 of the ELS authentication message structure according to the present invention is shown. The AUTH_ELS Flags field 14 includes a fragmentation bit 30 which is either set ("1") to indicate that "More Fragments Follow" or reset ("0") to indicate that "No More Fragments" follow. In other words, if the fragmentation bit 30 is set, it means that the AUTH_ELS carries a fragment of a larger Authentication message. If it is reset, it means the AUTH_ELS carries the last fragment of a larger Authentication message or the entire message. The AUTH_ELS Flags field 14 includes also a one bit Sequence Number 32, which is used for error recovery as explained in greater detail below, when a fragment of a larger Authentication message is lost. In this embodiment, bit position "7" in the AUTH_ELS Flags field 14 is designated fragmentation bit 30, and bit position "0" in the field 14 is designated Sequence Number bit 32. All the other bits in the field 14 are reserved. In alternative embodiments, any of the bit positions in the field 14 may be used as the fragmentation bit 30 or Sequence Number bit 32, or the Sequence Number field may be composed of more than one bit.

Referring to FIG. 3, a diagram of the fragmentation process of an AUTH_ELS message according to the present invention is shown. The authentication message 40 in this example is composed of three fragments 42, 44, and 46. Each fragment includes the fragmentation bit 30. The fragment bit 30 for fragment 42 and fragment 44 are both set ("1") and reset for fragment 46 ("0"). As such, the bit 30 for fragments 42, 44 indicates that each fragment is part of a larger message and that subsequent fragment(s) are to follow. The reset bit 30 for the fragment 46 indicates that fragment 46 in this example is the last fragment of a larger message. Each fragment 42, 44, and 46 also includes the remaining fields depicted in FIG. 1 but which are not shown for the sake of simplicity. Again, it should be noted that if the authentication message 40 was smaller than the maximum allowed size, the fragmentation bit 30 would be reset ("0"), because there would have been no need for fragmentation.

Figure 4:
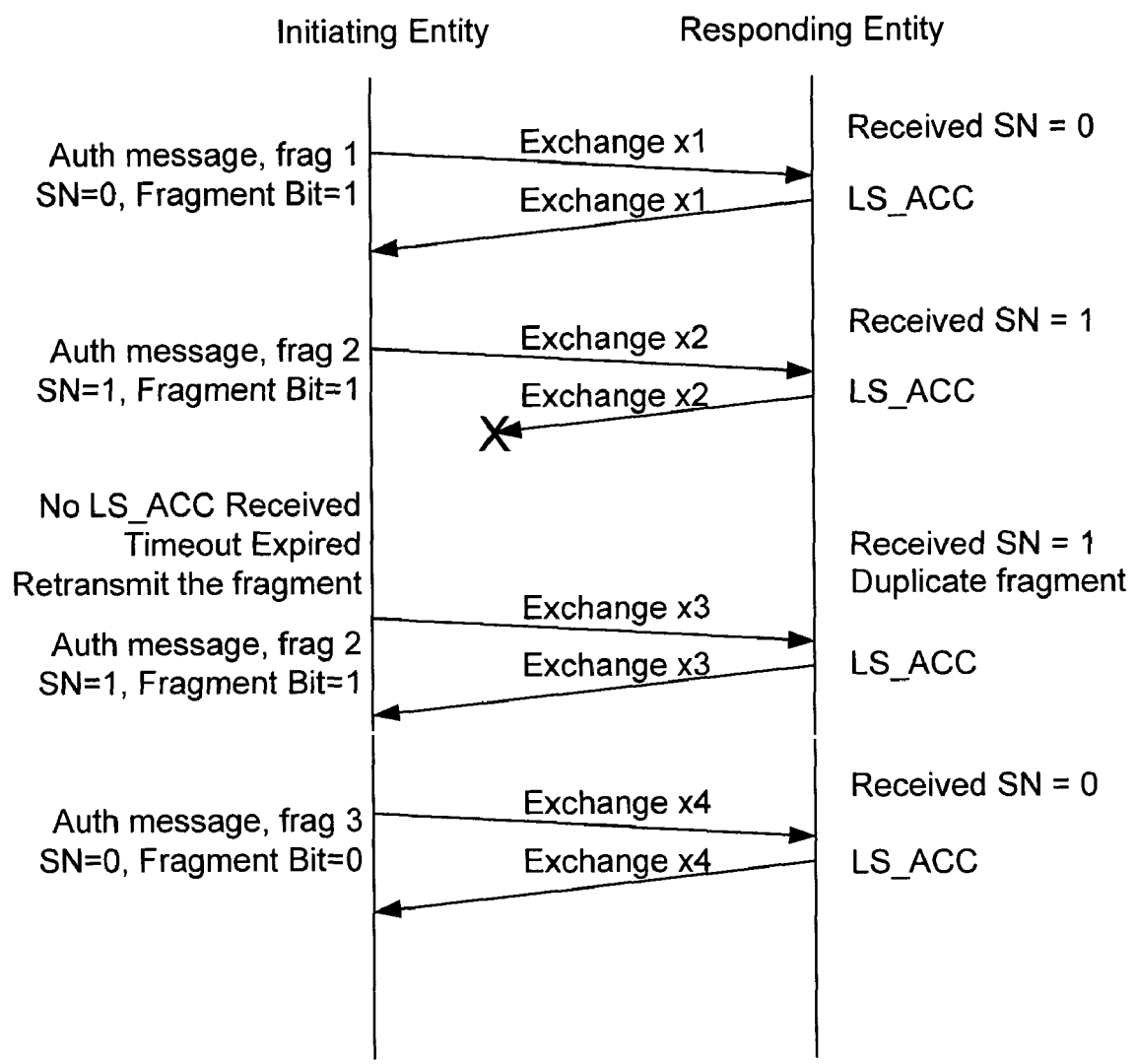
FIG. 4 is a diagram illustrating how the present invention deals with error recovery.

Referring to FIG. 4, a diagram explaining how the Sequence Number field 32 is used for error recovery is shown. The diagram assumes that (i) the initiating entity is sending an Authentication message to the responding entity; (ii) the responding entity accepts only limited ELSs; and (iii) the Authentication message needs to be fragmented into three fragments.

In the initial Exchange, the initiating entity sends the first fragment to the responding entity. The initiating entity then waits to receive an accept (LS_ACC) from the responding entity in the same Exchange (x1), as an acknowledgement that the first fragment has been received. When the (LS_ACC) message is received, the initiating entity sends the subsequent fragment. If on the other hand an (LS_ACC) is not received in a predetermined period of time, then the initiating entity retransmits the same fragment. The same fragment will be repeatedly sent each time the predetermined time period expires until the (LS ACC) is received.

The Sequence Number is used to uniquely identify a fragment so that the receiving entity can recognize if it is a new fragment that should be occupied or a duplicate (already received) fragment that should be discarded. In one embodiment of the present invention, an initiating entity will send only one fragment at a time. A second fragment will not be sent until an acknowledgement of the previous fragment has been received. Similarly, the Sequence Number is transitioned (i.e., from "1" to "0" or "0" to "1") only after the acknowledgment from the previous fragment has been received. Thus, when a receiving entity receives a fragment having a Sequence Number that differs than the previous fragment, the receiving entity recognizes it as a new fragment and accepts it. On the other hand, if the Sequence Number is the same, indicating that the sending entity is sending a duplicate of the fragment, then the receiving entity will discard it and send an acknowledgement to the sending entity. Since the Sequence Number simply alternates states, the field needs to be only one bit wide in this embodiment.

In a given network in which packet retransmission is possible, and in which the maximum number of packets in transit in the network at any given time is N, at least N+1 values are required to number each packet in order to allow a receiver to unambiguously detect if a packet is a duplicate of a previously received packet or if it is a new packet. For the present invention, N is one (1) since only one packet may be in transit in the network at any given time. The next or subsequent packet is sent only when the acknowledgement for the previous packet has been received. Consequently, a Sequence Number space of two is needed. With a number space of two, only a single bit which is capable of assuming two states, either set or reset, is sufficient. It should be noted, however, that the Sequence Number need not be limited to only one bit and could be any number of bits wide.

The responding entity accepts a fragment if its Sequence Number is greater than the one received with the previous fragment, otherwise it detects the fragment as a duplicate and discards its content. In this embodiment, with a number space of two, "greater" is equivalent to "different". Referring to the specific example of FIG. 4, the LS_ACC of the second fragment of the Authentication message is lost. Accordingly, after the expiration of a timeout period, the initiating entity retransmits the fragment, with the same Sequence Number. By checking it, the responding entity is able to detect this as a duplicated message and to discard its content, while continuing to participate in the protocol, i.e. sending the LS_ACC to the duplicated fragment.

In a Fabric, an initiating entity such as a Host has to authenticate itself before it can access a responding entity, such as the Fabric or another Host or storage device. The authentication process involves the communication of authentication messages 40 and acknowledgement messages from the initiating entity to the responding entity and vice versa. If one or both communicating entities have limitations in the size or width of the ELS messages they can support, then authentication message fragmentation is used to overcome this limitation. With each received fragment of an authentication message, the receiving entity, which can be either the initiating or responding entity, uses the value of the fragment bit 30 to understand if the authentication message 40 is complete or if more fragments are to follow. Each fragment is independently accepted by the receiving entity and acknowledged by replying with an accept message (LS_ACC) to the sending entity. The receipt of the (LS_ACC) message notifies the sender of the acceptance of the fragment. When the sending entity receives the LS_ACC acknowledgement, the sending entity will then send any subsequent fragments. This process is repeated until the last fragment of the authentication message 40 is sent. When the receiving entity receives a fragment with a fragmentation bit 30 reset, the receiving entity realizes that it has received the last fragment or the entire message. The receiving entity is therefore able to process the complete authentication message and respond as appropriate.

Figure 5:
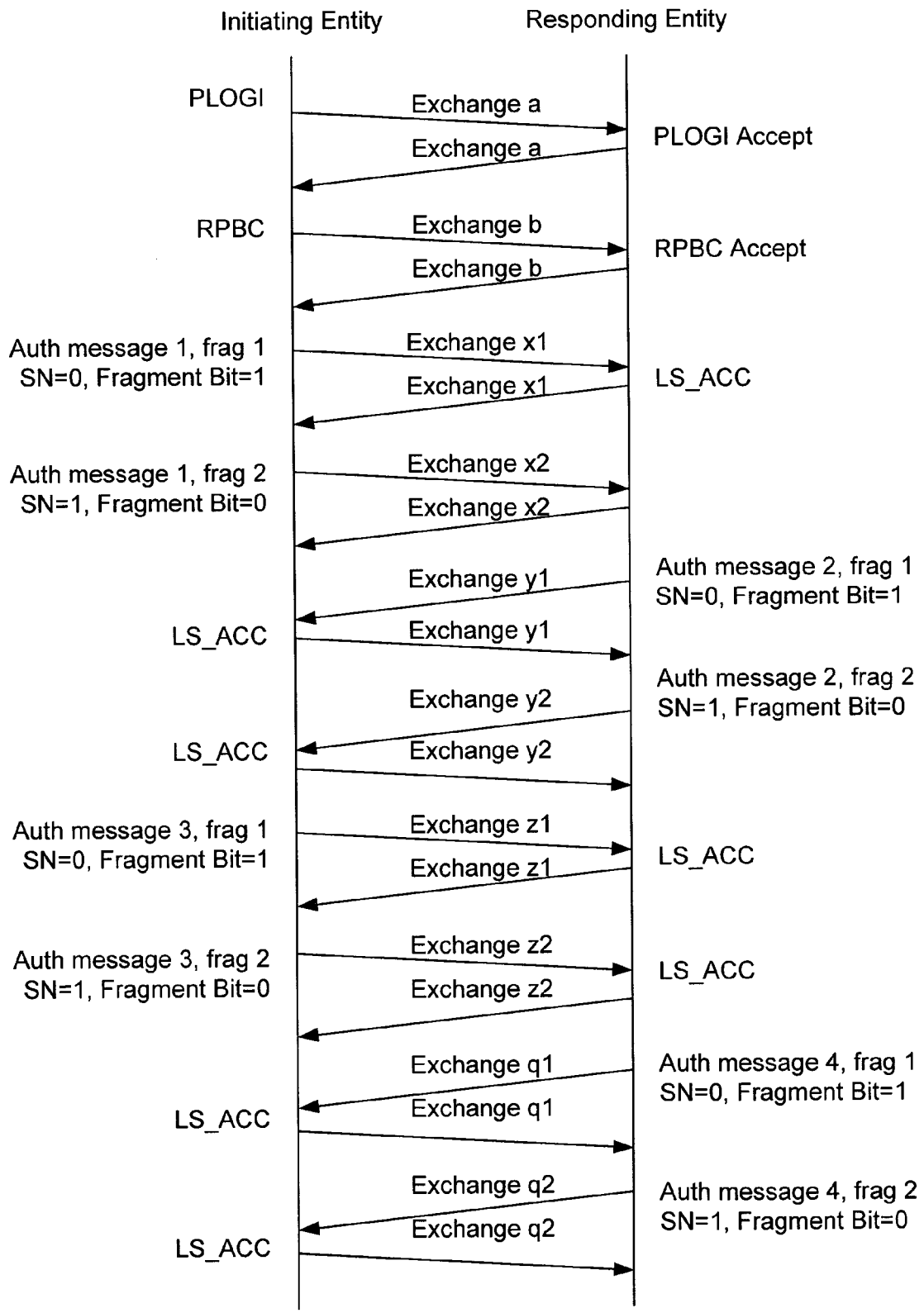
FIG. 5 is a diagram illustrating the sequence of authentication messages between two end devices according to the present invention.

Referring to FIG. 5, a diagram illustrating an exemplary exchange of authentication messages 40 between an initiating entity and a responding entity according to the present invention is shown. Each of the Exchanges of this sequence is described below.

In this sequence, a PLOGI (Process Login) message is the initial exchange (Exchange a) between the initiating entity and the responding entity. The responding entity replies with a PLOGI Accept. The PLOGI process allows the two involved entities to negotiate the communication parameters which will be used in any subsequent communication between them. In this phase the two entities discover if one or both of them have some limitations in supporting ELSs.

If one or both the involved entities have ELS support limitations, in the next Exchange b, the initiating entity sends an RPBC (Report Port Buffer Conditions) message and the responding entity issues an RPBC Accept. In this phase, each involved entity discovers the specific limitations of the other one, in particular the maximum size of an ELS message that each of them is able to receive.

A first authentication message 40 labeled "Auth message 1" is sent from the initiating to the responding entities. Since the Auth message 1 is large it is fragmented into two fragments ("frag 1" and "frag 2") to overcome the limitations of the responding entity. Accordingly, the two Exchanges are labeled x1 and x2 in the Figure respectively. In the first Exchange x1, the initiating entity sends the first fragment ("frag 1") with its Fragmentation bit 30 set to "1". The sequence Number is reset to zero (SN=0). The responding entity sends an acknowledgment LS_ACC in response. The initiating entity after processing the LS_ACC message sends in the second Exchange x2 the second fragment ("frag 2") with its Fragmentation bit 30 reset to "0". The sequence Number is set to one (SN=1). Again, the responding entity acknowledges receipt by issuing a LS_ACC response. Since the Fragmentation bit 30 is reset, the receiving entity understands that the second fragment is the last fragment of the authentication message. With each Exchange, the receiving entity verifies the value of the Sequence Number carried in each fragment to detect possible duplicated messages.

A second authentication message "Auth message 2" is sent in two Exchanges labeled "y1" and "y2" between the responding entity to the initiating entity. Again, the message is too large for the responding entity so it is sent in two fragments. In the first fragment (frag 1") the Fragmentation bit 30 is set to "1". The Sequence Number is reset to (SN=0). The initiating entity acknowledges receipt by issuing the LS_ACC message. Thereafter, the second fragment ("frag 2") is sent with the Fragmentation bit reset to "0". The Sequence Number is set to (SN=1). The initiating entity again acknowledges receipt by issuing the LS_ACC message. The initiating entity recognizes the Fragmentation bit 30 reset to "0", indicating that the second fragment is the last of the authentication message. In this process, the receiving entity continuously verifies the value of the Sequence Number carried in each fragment to detect possible duplicated messages.

The next Exchange Z is a third authentication message (Auth message 3) initiated by the initiating entity to the responding entity. In the first fragment ("frag 1") the Fragmentation bit 30 is set to "1". The Sequence Number is reset to (SN=0). The responding entity acknowledges receipt by issuing the LS_ACC message. Thereafter, the second fragment ("frag 2") is sent with the Fragmentation bit reset to "0". The Sequence Number is set to (SN=1). The responding entity again acknowledges receipt by issuing the LS_ACC message. With the Fragmentation bit 30 reset to "0", the responding entity realizes the second fragment is the last fragment of the authentication message. In this process, the receiving entity continuously verifies the value of the Sequence Number carried in each fragment to detect possible duplicated messages.

The final Exchange Q is a fourth authentication message (Auth message 4) initiated by the responding entity. In the first fragment ("frag 1") the Fragmentation bit 30 is set to "1". Sequence Number is reset to (SN=0). The initiating entity acknowledges receipt by issuing the LS_ACC message. Thereafter, the second fragment ("frag 2") is sent with the Fragmentation bit reset to "0". The Sequence Number is set to (SN=1). The initiating entity acknowledges receipt by issuing the LS_ACC message, and recognizes the second fragment as the last of the authentication message, having the Fragmentation bit 30 reset to "0". Again in this process, the receiving entity continuously verifies the value of the Sequence Number carried in each fragment to detect possible duplicated messages.

The aforementioned sequence is intended to be generic in the sense that it provides a general description of how any authentication exchange may occur between entities with limited ELS support in a Fabric. In particular, more or less than four authentication messages may be exchanged between two authenticating entities in order to properly authenticate each other. In a specific situation for example, the first authentication message may be an AUTH_Negotiate message initiated by the initiating entity. During this exchange, the initiating entity will begin negotiations with the responding entity, identify itself by its Node Name, request that the target entity authenticate itself, and inquire which authentication protocols (such as DH-CHAP, SRP, or FCAP) the target entity supports. The following authentication messages depend on the specific authentication protocol chosen by the responding entity. Using one of the possible authentication protocols, both entities are able to verify their identity. Only when this verification is successful the authentication protocol transaction is successfully concluded.

With the present invention as described above, authentication messages can be encapsulated and propagated across any Fibre Channel Fabric, regardless of how long the messages a particular device may be able to support. This feature is desirable because it means the present invention can be implemented across any existing Fibre Channel device or Fabric without hardware modifications and without requiring any redesign of any Fibre Channel entity, such as Hosts, Switches, storage devices, or the like.

Although only a few embodiments of the present invention have been described in detail, it should be understood that the present invention may be embodied in many other specific forms without departing from the spirit or scope of the invention. For example, although the present invention has been described in relation to the limited Extended Link Services for authentication, it should be understood that the present invention may be used to encapsulate any long messages over any limited Fibre Channel service. Therefore, the present examples are to be considered as illustrative and not restrictive, and the invention is not to be limited to the details given herein but may be modified within the scope of the appended claims.

The invention claimed is:

1. A method, comprising:
   at a source entity, sending a Process Login (PLOGI) message to a target entity, the source entity and target entity being part of a fibre channel Fabric;
   at the source entity, receiving a PLOGI Accept message from the target entity, wherein the exchange of PLOGI messages allows the source entity and the target entity to determine whether either of the source entity or the target entity has limitations in supporting Extended Link Services (ELS) messages, wherein if either the source entity or target entity has ELS support limitations, the source entity sends a reporting message to which the target entity responds with a reporting accept message, the exchange of such reporting messages allowing the source entity and the target entity to identify the maximum length of an ELS message that the other entity is able to receive;
   determining at the source entity that an authentication message has a length that exceeds the ELS message length supported by the target entity;
   fragmenting the authentication message into message fragments including a first message fragment and a second message fragment;
   generating by using a processor at the source entity a first Extended Link Services (ELS) message including the first message fragment, wherein the first ELS message is associated with a first exchange;
   generating a second ELS message including the second message fragment, wherein the second ELS message is associated with a second exchange;
   at the source entity, sending the message fragments including the first message fragment and the second message fragment to the target entity, wherein the second message fragment is sent after determining that the first exchange is complete.

2. The method of claim 1, wherein fragmenting the authentication message into message fragments further comprises setting a fragmentation bit in each message fragment except the last message fragment.

3. The method of claim 2, wherein the setting of the fragmentation bit of one of the message fragments indicates that a subsequent message fragment is to be sent.

4. The method of claim 1, wherein fragmenting the authentication message into message fragments further comprises resetting a fragmentation bit in the last message fragment of the authentication message.

5. The method of claim 1, wherein fragmenting the authentication message into message fragments further comprises labeling each message fragment with a Sequence Number.

6. The method of claim 4, wherein the resetting of the fragmentation bit in the fragmentation field of the last message fragment indicates that no subsequent message fragments will follow the last message fragment.

7. The method of claim 1, wherein the message comprises, but is not limited to, authentication information and contains one or more of the following fields:
   a field that identifies the authentication message as an authentication message; and
   an authentication command code field that identifies the particular authentication message of an authentication protocol.

8. The method of claim 6, wherein the authentication protocol comprises but is not limited to the following protocols: DH-CHAP, SRP, or FCAP.

9. The method of claim 1, wherein the target entity is an end device in the Fabric.

10. The method of claim 1, wherein the target entity is the Fabric.

11. The method of claim 6, wherein the target entity either accepts or discards the message fragment based on the value of the Sequence Number.

12. An apparatus, comprising:
a processor operable to determine that an authentication message has a length that exceeds an Extended Link Services (ELS) message length supported by a target entity in a fibre channel Fabric, wherein the processor makes this determination after sending a Process Login (PLOGI) message to the target entity and receiving a PLOGI Accept message from the target entity, wherein the exchange of PLOGI messages allows the apparatus and the target entity to determine whether either of the apparatus or the target entity has limitations in supporting ELS messages, wherein if either the apparatus or target entity has ELS support limitations, the apparatus sends a reporting message to which the target entity responds with a reporting accept message, the exchange of such reporting messages allowing the apparatus and the target entity to identify the maximum length of an ELS message that the other entity is able to receive, wherein the processor is further operable to fragment the authentication message into message fragments including a first message fragment and a second message fragment, and generate a first Extended Link Services (ELS) message including the first message fragment and a second ELS message including the second message fragment, wherein the first ELS message is associated with a first exchange and the second ELS message is associated with a second exchange;
an interface connected to the processor, the interface operable to send the message fragments including the first message fragment and the second message fragment to the target entity, wherein the second message fragment is sent after determining that the first exchange is complete.

13. The apparatus of claim 12, wherein the processor sets a fragmentation bit in each message fragment except the last message fragment.

14. The apparatus of claim 13, wherein the fragmentation bit is used to indicate that a subsequent message fragment is to be sent by the initiating entity.

15. The apparatus of claim 12, wherein a fragmentation bit in the last message fragment of the authentication message is set.

16. The apparatus of claim 12, wherein each message fragment is labeled with a Sequence Number.

17. A system, comprising:
means for sending at a source entity a Process Login (PLOGI) message to a target entity, the source entity and target entity being part of a fibre channel Fabric;
means for receiving a PLOGI Accept message at the source entity from the target entity, wherein the exchange of PLOGI messages allows the source entity and the target entity to determine whether either of the source entity or the target entity has limitations in supporting Extended Link Services (ELS) messages, wherein if either the source entity or target entity has ELS support limitations, the source entity sends a reporting message to which the target entity responds with a reporting accept message, the exchange of such reporting messages allowing the source entity and the target entity to identify the maximum length of an ELS message that the other entity is able to receive;
means for determining at the source entity that an authentication message has a length that exceeds the ELS message length supported by the target entity;
means for fragmenting the authentication message into message fragments including a first message fragment and a second message fragment;
means for generating by using a processor at the source entity a first Extended Link Services (ELS) message including the first message fragment, wherein the first ELS message is associated with a first exchange;
means for generating a second ELS message including the second message fragment, wherein the second ELS message is associated with a second exchange;
means for sending at the source entity the message fragments including the first message fragment and the second message fragment to the target entity, wherein the second message fragment is sent after determining that the first exchange is complete.

18. The system of claim 17, wherein fragmenting the authentication message into message fragments further comprises setting a fragmentation bit in each message fragment except the last message fragment.

19. The system of claim 18, wherein the setting of the fragmentation bit of one of the message fragments indicates that a subsequent message fragment is to be sent.

20. The system of claim 17, wherein fragmenting the authentication message into message fragments further comprises resetting a fragmentation bit in the last message fragment of the authentication message.

21. The system of claim 17, wherein fragmenting the authentication message into message fragments further comprises labeling each message fragment with a Sequence Number.

22. The system of claim 20, wherein the resetting of the fragmentation bit in the fragmentation field of the last message fragment indicates that no subsequent message fragments will follow the last message fragment.

23. The system of claim 17, wherein the message comprises, but is not limited to, authentication information and contains one or more of the following fields:
a field that identifies the authentication message as an authentication message; and
an authentication command code field that identifies the particular authentication message of an authentication protocol.

24. The system of claim 17, further comprising means for sending an RPBC (Report Port Buffer Conditions) message to the target entity, wherein the target entity responds with information regarding a maximum authentication message length supported by the target entity.

25. The system of claim 24, further comprising means for sending information regarding a maximum authentication message length supported by the source entity.

* * * * *